United States Patent [19]

Cap

[11] Patent Number: 4,598,239
[45] Date of Patent: Jul. 1, 1986

[54] CIRCUIT FOR REGULATING THE RPM AND PHASE OF A MOTOR

[75] Inventor: Heinrich Cap, St. Georgen, Fed. Rep. of Germany

[73] Assignee: Papst-Motoren GmbH & Co. KG, St. Georgen, Fed. Rep. of Germany

[21] Appl. No.: 566,184

[22] Filed: Dec. 28, 1983

[51] Int. Cl.⁴ ............................................. H02P 5/16
[52] U.S. Cl. .................................. 318/314; 318/328; 318/317; 318/345 B; 318/341
[58] Field of Search ............... 318/301, 310, 311, 314, 318/315, 317, 318, 326, 327, 345 A, 599, 437, 341, 453, 345 B

[56] References Cited

U.S. PATENT DOCUMENTS

| | | | |
|---|---|---|---|
| 3,355,649 | 11/1967 | Boylan et al. | 318/314 |
| 3,596,162 | 7/1971 | Takayama | 318/341 |
| 3,622,852 | 11/1971 | Myers | 318/328 |
| 4,114,075 | 9/1978 | Minakuchi | 318/327 X |
| 4,149,116 | 4/1979 | Minakuchi | 318/317 X |
| 4,153,864 | 5/1979 | Minakuchi | 318/341 |
| 4,240,014 | 12/1980 | Müller | 318/314 X |
| 4,337,424 | 6/1982 | Cap et al. | 318/328 |

FOREIGN PATENT DOCUMENTS

| | | |
|---|---|---|
| 2020272 | 2/1971 | Fed. Rep. of Germany . |
| 2026975 | 12/1971 | Fed. Rep. of Germany . |
| 2550153 | 6/1976 | Fed. Rep. of Germany . |
| 2819779 | 11/1978 | Fed. Rep. of Germany . |

OTHER PUBLICATIONS

Motorola, article entitled "MC14046B", consisting of six pages, photocopied onto 3 sheets, the last two pages being numbered 9-136 and 9-137.

Primary Examiner—William M. Shoop, Jr.
Assistant Examiner—Shik Luen Paul Ip
Attorney, Agent, or Firm—Theodore J. Koss, Jr.

[57] ABSTRACT

A timing signal has a value changing during its period and a frequency dependent on actual motor rpm. A reference signal has an average value indicating desired rpm and a superimposed sawtooth component used, after desired rpm is reached, to generate phase-error information. A comparator receives the two signals and produces an output pulse which begins when the timing signal reaches the value of the reference signal, and which ends at the end of the period of the timing signal. In the case of rpm error, the comparator output pulse duration serves to regulate rpm; in the steady state, it serves to regulate phase. A sample-and-hold capacitor converts the aforementioned pulse duration into a lengthier motor-control signal. In the case of rpm error, the pulse duration inaccurately indicates the amount of rpm error, the inaccuracy corresponding to the difference between the average and instantaneous values of the reference signal. During motor start-up, the amplitude of the sawtooth component of the reference signal is attenuated, to thereby reduce the difference between such average and instantaneous values and thus increase the accuracy of indication of the rpm error. The falling sawtooth flank is substantially more than half the period of the sawtooth, so that phase error can be indicated within a correspondingly large range of values.

39 Claims, 4 Drawing Figures

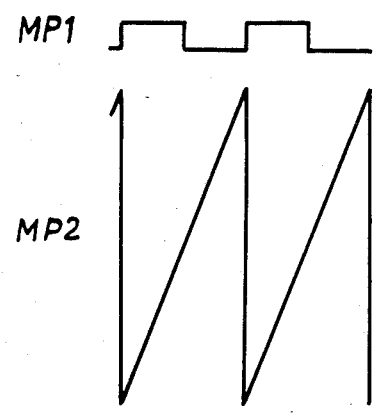
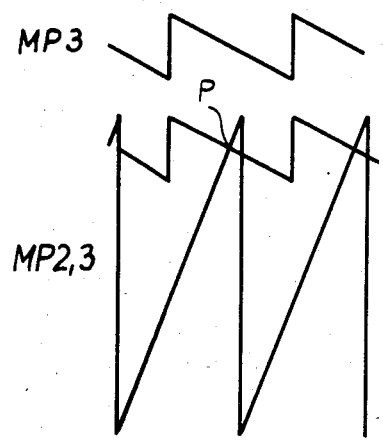
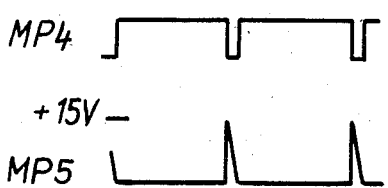
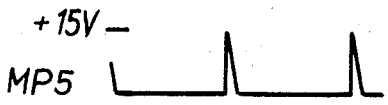
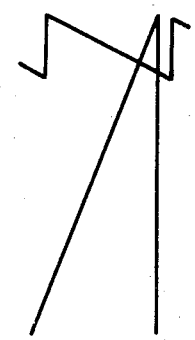
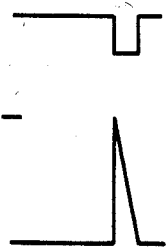
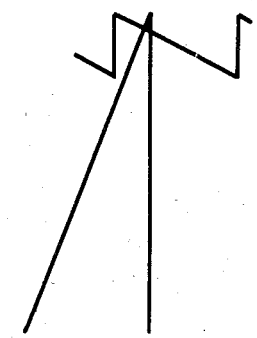
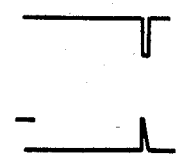
Fig. 2  Fig. 3  Fig. 4

CIRCUIT FOR REGULATING THE RPM AND PHASE OF A MOTOR

BACKGROUND OF THE INVENTION

It is frequently necessary, e.g. in the case of audio tape equipment or record players, to very exactly regulate the rpm of a drive motor and maintain it constant over long time periods. This object is typically achieved by using a negative-feedback rpm-regulating system in which a feedback signal indicative of actual motor rpm is compared with a reference signal indicative of desired motor rpm, the reference signal being derived from a quartz-crystal oscillator of well-defined frequency. In such systems, when the desired rpm has been established, thereafter the energization of the motor is controlled by regulation of the phase shift of the motor relative to the reference frequency; the rpm per se does not fluctuate, except to the extent incidental to such phase regulation.

Various circuits are known which can implement this type of regulation. Frequently, use is made of integrated circuits specially developed for such purpose. However, these are not always capable of being used to realize all the system criteria of a particular application; they generally do not provide sufficient degrees of freedom in the selectability of various parameters, such as for example the frequency which the pulse train from a feedback tachometer will have at a particular desired rpm. The type of regulation in question can, alternatively, be implemented by means of a suitably programmed microprocessor. Usually, however, this is economically feasible only when, for example, the equipment being powered by the motor includes such a microprocessor for other purposes, and where the unused capacity of the microprocessor is sufficient to accommodate and implement the motor-regulation program. Thus, it can happen that, if the special integrated circuits are not suitable for a particular application, and if a microprocessor is not conveniently present, one may be obliged to revert to more elementary rpm regulation without the benefits of phase regulation.

SUMMARY OF THE INVENTION

It is therefore a main object of the invention to provide a relatively simple and inexpensive supplemental circuit, by means of which it is possible to expand the capabilities of a conventional rpm-regulating circuit in such a way that it become inherently able also to regulate phase after the desired rpm has been achieved.

Preferably, such expansion of regulating capability should leave the original rpm-regulating characteristics of the conventional circuit unchanged as much as possible.

In the herein disclosed preferred embodiment of the invention, use is made of a conventional rpm-regulating circuit of the type which employs a periodic timing signal; the timing signal has a value which changes during the period thereof, and has a frequency dependent upon actual motor rpm. In this type of circuit, the timing signal is applied to a comparator, or the equivalent, and compared against a reference signal whose level is representative of desired rpm. The value of the timing signal reaches the reference-signal level at a point in time which occurs sooner or later within the period of the timing signal, depending upon the amount of the rpm error. Motor energization is then automatically varied in dependence upon such variable point in time. By way of example, the comparator may be used to produce one output pulse per cycle of the timing signal; the output pulse commences when the value of the timing signal reaches the reference-signal level; the output pulse ends at the end of the timing signal cycle. In this way, the duration of the comparator output pulse corresponds to the fraction of a timing signal cycle during which the timing signal is in excess of the reference-signal level. This duration can be made to correspond accurately to the amount of the rpm error.

In the case of such conventional rpm-regulating circuit, the present invention contemplates superimposing upon the reference-signal level a periodic component which can be used to indicate phase error. In the conventional circuit, when the rpm-error has been brought to zero, the point in time during the timing signal cycle at which the value of the timing signal reaches the reference-signal level will in principle remain unchanged in the steady state. However, when such periodic component is superimposed on the reference-signal level, the aforementioned point in time will continue to be variable after the rpm-error has been eliminated, i.e. now variable in dependence on phase.

If the superimposed periodic component were to be in the form of a full-wave-rectified sinusoid, or in the form of a sawtooth having rising and falling flanks of equal duration, then the aforementioned point in time could vary in a phase-difference-indicating manner during only half the period of the resultant reference signal, and thus indicate phase-difference values in a range of only ±90°. Thus, the present invention furthermore contemplates using a periodic component having the form of a sawtooth whose rising flank has a duration equal to 0% and whose falling flank has a duration equal to 100% of the sawtooth period, or vice versa. In this way, the aforementioned point in time can vary in a phase-difference-indicating manner during the whole period of the sawtooth, and thus indicate phase-difference values in a range of ±180°. It will be appreciated that a ratio of 0%:100% cannot be achieved. However, a ratio of about 5%:95% can feasibly be achieved, and thus is preferred. A ratio of about 20%:80% can be achieved quite easily and thus represents a very practical solution. In any event, it is preferred that the longer flank have a duration considerably in excess of 50%.

Preferably, the longer flank of the sawtooth is as nearly linear as possible.

With such periodic component superimposed on the reference-signal level, the d.c. or average value of the reference signal can remain unchanged, and can continue to represent desired rpm. In principle, therefore, the reference signal can continue to be used, prior to reaching the desired rpm, to eliminate the rpm-error. However, the variable point in time at which the timing signal reaches the now periodic reference signal will now be a somewhat inaccurate measurement of the rpm-error, the degree of inaccuracy corresponding to the difference between the average and instantaneous values of the reference signal. The degree of inaccuracy can be reduced, by reducing the amplitude of the superimposed periodic component, but this reduces phase-error sensitivity.

Therefore, according to a further concept of the invention, when the rpm-error is non-zero, e.g. during start-up of the motor, the amplitude of the periodic component is attenuated, to reduce the inaccuracy in the measurement of rpm-error. Then, at least when the rpm-error has been brought to zero, the full amplitude of the periodic component of the reference signal is restored, for maximum sensitivity in phase regulation.

Preferably, care is taken that the attenuation of the amplitude of the periodic component not change the average value of the reference signal.

As already stated, the concepts of the invention may be applied to existing rpm-regulating circuits, to expand their existing capabilities to include phase regulation after desired rpm has been reached. It will be appreciated, however, that the invention can likewise be seen in the resulting circuit itself, independently of whether it was in fact built from an existing rpm-regulating circuit in a particular instance.

The novel features which are considered characteristic for the invention are set forth in particular in the appended claims. The invention itself, however, both as to its construction and its method of operation, together with additional objects and advantages thereof, will be best understood from the following description of a preferred embodiment when read in conjunction with the accompanying drawing.

BRIEF DESCRIPTION OF THE DRAWING

FIG. 2 depicts the potentials at circuit points MP1–MP5 of FIG. 1 in the steady state, FIGS. 3 and 4 in the case of phase lag and phase lead, respectively.

DESCRIPTION OF THE PREFERRED EMBODIMENT

Figure 1:
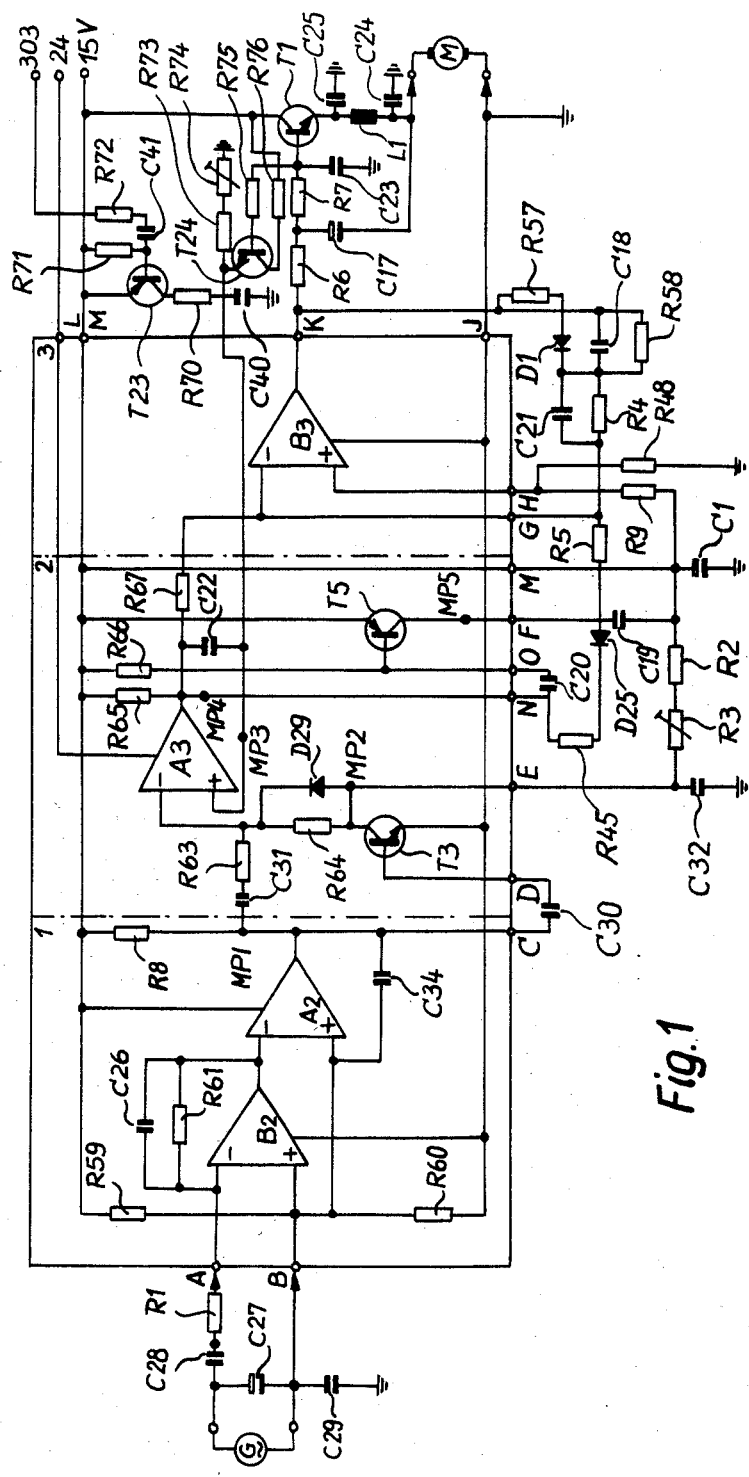
FIG. 1 depicts a circuit constituting an exemplary embodiment of the present invention.

FIG. 1 depicts a concrete circuit embodying the concepts of the present invention. M denotes a D.C. motor provided with a feedback tachometer G. A line 303 receives a reference-frequency signal derived from a (non-illustrated) quartz-oscillator stage. The illustrated circuit serves to maintain the rpm of motor M at a predetermined value, here assumed to be 300 rpm, synchronized in phase with the reference-frequency signal. The invention may equally be embodied in the control of an a.c. motor.

Tachometer G is connected across circuit terminals A, B, via a capacitor C28 and a resistor R1. A capacitor C27 is connected across the terminals of tachometer G, and a capacitor C29 connects the lower terminal of the tachometer to ground.

A voltage divider R59, R60 is connected between the +15 V line of the circuit (terminal M) and the ground line of the circuit (terminal J). The junction between the two voltage-divider resistors R59, R60 is connected to the non-inverting input of an operational amplifier B2, which latter is furthermore connected to circuit terminal B. The inverting input of operational amplifier B2 is connected to circuit terminal A. A feedback branch, comprised of a resistor R61 and a parallel capacitor C26, connects the output of operational amplifier B2 to its inverting input. The output of operational amplifier B2 is connected to the inverting input of an operational-amplifier comparator A2, whose non-inverting input is connected to circuit terminal B. A feedback capacitor C34 connects the output of operational amplifier A2 to its non-inverting input. The output of comparator A2 is connected via a resistor R8 to the +15 V line (terminal M) and is also connected to a circuit terminal C. The two operational amplifiers B2, A2 and their associated elements form a first stage 1 whose purpose is merely to convert the e.g. sinusoidal output voltage of tachometer G into a well-defined rectangular tachometer pulse train, available at the output of operational amplifier A2 (circuit point MP1).

At circuit point MP1, the output signal from first circuit stage 1 is applied to the input of second circuit stage 2. In particular, the output of operational amplifier A2 is connected via a capacitor C31 and a resistor R63 to the inverting input of an operational-amplifier comparator A3. The non-inverting input of comparator A3 receives a reference signal (circuit point MP3) whose composition and generation will be described further below.

The lower terminal of a timing capacitor C32 is connected to ground, and its upper terminal is connected to a circuit terminal E, and thereby connected via the parallel combination of a resistor R64 and diode D29 to the inverting input of comparator A3. A capacitor-discharging transistor T3 has a collector-emitter path connected in parallel to timing capacitor C32; in particular, the collector of transistor T3 is connected via terminal E to the upper input of capacitor C32, and its emitter is connected to the ground-line circuit terminal J. The base of capacitor-discharging transistor T3 is connected to a circuit terminal D. A differentiating capacitor C30 is connected between circuit terminals C and D. As described further below, the leading and trailing edges of the tachometer pulse train (MP1) are differentiated by capacitor C30 to produce at terminal D positive and negative voltage pulses; the positive pulses each serve to render capacitor-discharging transistor T3 briefly conductive to discharge timing capacitor C32 once per cycle of the tachometer pulse train. The voltage at the ungrounded terminal of capacitor C32 is transmitted via diode D29 to the inverting input of comparator A3.

As already stated, timing capacitor C32 is discharged by transistor T3. Capacitor C32 is charged via a potentiometer R3 and a resistor R2 from circuit terminal M, which is the +15 V supply line of the circuit.

A capacitor C1 is connected between ground and the +15 V supply line, to stabilize the +15 V supply voltage to the circuit.

A capacitor C22 is connected between the output and non-inverting input of comparator A3. As described further below, comparator A3 produces a negative output signal when the potential at its "−" input exceeds that at its "+" input, and otherwise a positive output signal; once per cycle of the rectangular tachometer pulse train (MP1), comparator A3 produces a negative output pulse whose duration is a function of the discrepancy or phase discrepancy between the tachometer pulse train and the reference signal at the "+" input of comparator A3. The duration of the output pulse is measured by a sample-and-hold capacitor C19 provided with a resetting transistor T5. The base of resetting transistor T5 is connected to circuit terminal M (+15 V) via a resistor R66, and is further connected to a circuit terminal O. The emitter of resetting transistor T5 is connected to the +15 V circuit terminal M, and its collector is connected via circuit terminal F to the upper terminal of sample-and-hold capacitor C19.

The output of comparator A3 is connected to a circuit terminal N, and the latter is connected to circuit terminal O via a differentiating capacitor C20. A charging diode D25 and series-connected resistor R45 connect the upper terminal of sample-and-hold capacitor C19 to circuit terminal N. The output of comparator A3 is further connected via a resistor R65 to the +15 V circuit terminal M. As described more fully further below, when comparator A3 produces its variable-duration negative output pulse, the negative flank thereof is differentiated by capacitor C20 to apply a brief negative pulse to the base of resetting transistor T5; the latter is rendered conductive, thereby simply short-circuiting sample-and-hold capacitor C19. At the end of the brief conduction time of resetting transistor T5, sample-and-hold capacitor C19 commences to charge towards the negative voltage at the output of comparator A3, via charging diode D25 and resistor R45; the voltage which builds up across sample-and-hold capacitor C19 is a function of the duration of the negative pulse at the output of comparator A3, so that the information represented by such pulse duration is thus converted into a corresponding persisting voltage value.

The upper terminal of sample-and-hold capacitor C19 is connected via a resistor R5 and a circuit terminal G to the inverting input of an operational amplifier B3, which input is also connected via a resistor R67 to the output of comparator A3. The non-inverting input of operational amplifier B3 is connected via a circuit terminal H to the junction between two voltage-divider resistors R9, R48; voltage divider R9, R48 is connected between ground and the +15 V circuit terminal M. The voltage at the "+" input of operational amplifier B3 merely serves to establish the operating point thereof. The output of operational amplifier B3 is connected to a circuit terminal K, and is furthermore connected to its inverting input via a feedback network R57, D1, C18, R58, C21, R4. Specifically, terminal K is connected to the upper terminal of a resistor R57 whose lower terminal is connected to the anode of a diode D1, the anode of the latter being connected to the right terminal of a capacitor C21 whose left terminal is connected to circuit terminal G. A resistor R4 is connected across the terminals of capacitor C21. The parallel connection of a resistor R58 and a capacitor C18 is connected between the cathode of diode D1 and the upper terminal of resistor R57. This feedback network R57, D1, C18, R58, C21, R4, in cooperation with input resistor R5, serves to establish the gain which operational amplifier B3 will impose upon the input signal from sample-and-hold capacitor C19.

The output of operational amplifier B3 (terminal K) is connected, via a resistor R6 and a filter C17, R7, C23 to the base of a motor-current transistor T1. The collector of motor-current transistor T1 is connected to the +15 V supply line; its emitter is connected, via a filter C25, L1, C24, to the upper terminal of motor M. The lower terminal of motor M is connected to ground.

As already stated, the non-inverting input of comparator A3 receives a reference signal derived from a (non-illustrated) quartz-oscillator stage. The quartz-oscillator stage supplies a rectangular reference-frequency signal to line 303. This rectangular reference-frequency signal is transmitted, via a resistor R72 and a differentiating capacitor C41 to the base of a charging transistor T23. The emitter of charging transistor T23 is connected to the +15 V supply line, and a resistor R71 is connected across the base-emitter junction of the transistor. The collector of charging transistor T23 is connected via a charging resistor R70 to the upper terminal of a storage capacitor C40, whose lower terminal is connected to ground. The storage capacitor C40 can discharge to ground via a discharge resistor R73 and potentiometer R74. The charging time constant of storage capacitor C40 is determined by the capacitance of C40 and the resistance of R70, whereas the discharging time constant is determined by C40 and the resistance of R73 and R74. As explained more fully below, the charging time interval of storage capacitor C40 is relatively short, and its discharging time interval is relatively long. The upper terminal of storage capacitor C40 is connected directly to the non-inverting input of comparator A3 (circuit point MP3).

A start-up transistor T24 has an emitter connected to the upper terminal of storage capacitor C40 and a collector which is connected via a resistor R76 to the +15 V supply line. The base of start-up transistor T24 is connected to circuit terminal K and thereby to the output of operational amplifier B3, via a resistor R75, the filter C17, R7, C23, and the resistor R6. As explained more fully below, when the motor rpm is below the desired value during e.g. motor start-up, start-up transistor T24 is conductive, thereby connecting the upper terminal of storage capacitor C40, via resistor R76, to the +15 V supply line.

Circuit terminal L is connected, in this embodiment, to a +24 V operating voltage line, for connection to the operating-voltage terminals of certain operational amplifiers.

The tachometer G, whose rotor is coupled to the rotor of motor M and turns in unison therewith, produces an output signal, as already stated, consisting of tachometer signal cycles. Generally, the number of tachometer signal cycles produced per rotation of the rotor of motor M will be greater than one. In correspondence thereto, the reference-frequency signal, furnished via line 303 from the (non-illustrated) quartz-oscillator stage, will have a frequency which is equal to that reached by the tachometer signal when the motor rpm reaches the desired value.

In the illustrated circuit, the components may by way of example have the following values. The capacitors (in farads): C1 22$\mu$; C17 0.47$\mu$; C18 15n; C19 22n; C20 1n; C21 470; C22 100p; C23 0.1$\mu$; C24, C25 0.1$\mu$; C26 4.7n; C27, C28 10$\mu$; C29 0.1$\mu$; C30 470p; C31 22p; C32 22n; C34 100p; C40 3.3$\mu$; C41 22n. The resistors (in ohms): R1 270; R2 121K; R3, R9, R59, R60, R65, R66, R73 10K; R4 1M; R5 2.2M; R6 1K; R7, R46, R63, R71 2.2K; R8, R74 4.7K; R45 1.5K; R48 22K; R57 330K; R58, R67 4.7M; R61 180K; R64 47K; R70 470; R72 15K. Inductor L1 47 $\mu$H. Diodes D1, D25, D29 of type 1N4148. The transistor types: T1 BC517; T3 BC238B; T5, T23 BC558B. The op.-amps. and op-amp. comparators all of type LM392; the illustrated "−", "+" and operating-voltage terminals respectively being the #2, #3 and #8 terminals in the case of A2, A3, and respectively being the #6, #5 and #4 terminals in the case of B2, B3.

The operation of the illustrated circuit will now be described, first with regard to steady-state operation:

Tachometer G produces an e.g. sinusoidal output voltage which is converted at the output of comparator A2 into a rectangular tachometer pulse train depicted at MP1 in FIG. 2.

The leading and trailing flanks of the rectangular tachometer pulses are differentiated by capacitor C30 to produce positive and negative voltage pulses of short duration. The positive pulses each serve to briefly render discharging transistor T3 conductive. When transistor T3 is rendered conductive, it short-circuits and discharges the timing capacitor C32, as can be seen at MP2 in FIG. 2.

As shown at MP2 in FIG. 2, after timing capacitor C32 is quickly discharged at the start of each tachometer pulse cycle, it then commences to charge, in particular via potentiometer R3, charging resistor R2, and circuit terminal M, towards +15 V. The rate at which timing capacitor C32 charges is fixed and independent of motor rpm in the illustrated exemplary embodiment. However, the length of the charging time interval of capacitor C32 is of course determined by motor rpm; the lower the rpm, the longer is the charging time interval; the higher the rpm, the shorter is the charging time interval. The potential at the upper terminal of timing capacitor C32 is applied via diode D29 to the inverting input of comparator A3.

The non-inverting input of comparator A3 receives the reference signal depicted at MP3 in FIG. 2, transmitted from the upper terminal of storage capacitor C40.

The two input voltages to comparator A3 are shown superimposed in FIG. 2, at MP2,3, and the output voltage of the comparator is shown at MP4. As can be seen, when the potential at the "−" input of comparator A3 reaches the potential at the "+" input, the comparator output signal becomes negative. In the present circuit, when this occurs during the charging of timing capacitor C32, the latter of course continues to charge, and the comparator output signal thus remains negative. However, at the start of the next cycle of the tachometer pulse train (MP1), the charging cycle of timing capacitor C32 ends, and the latter discharges rapidly. As a result, the output voltage of comparator A3 (MP4) becomes positive again.

As already stated, it is being assumed for the present that the circuit is operating in its steady-state condition, wherein the motor rpm has exactly the desired value, and the tachometer pulse train (MP1) is in phase synchronism with the reference signal (MP3). In such state of phase synchronism, the increasing voltage across timing capacitor C32 (see MP2,3 in FIG. 2) becomes equal to the value of the reference signal at a point in time P which is substantially midway between the start and end of the slowly falling flank of the reference signal. In such phase-synchronized condition, the negative output pulse of comparator A3 has the duration shown at MP4 in FIG. 2.

In contrast, consider the case depicted in FIG. 3, where the phase of the tachometer pulse train is lagging the phase of the reference signal; motor M must be briefly increased in speed, to eliminate such phase lag. In such condition of phase lag, the timing capacitor voltage MP2 will become equal to the reference voltage MP3 later within the cycle of the reference signal, and thus at a point in time P where the reference signal is of lower value than in the case of an exactly steady-state condition; i.e., later in the reference-signal cycle, and earlier in the timing-signal cycle. As a result, the output pulse of comparator A3 will be of longer duration than in the steady-state case.

On the other hand, consider the case depicted in FIG. 4, where the motor rpm is of the correct value but the phase of the tachometer pulse train is leading the phase of the reference signal. Here, point P will occur earlier in the reference-signal cycle and later in the timing-signal cycle; the comparator output pulse is of shorter duration than in the steady-state case.

In any of these three cases (steady-state, phase lag, phase lead), the leading flank of the negative output pulse from comparator A3 is differentiated by capacitor C20, producing a negative pulse of short duration briefly rendering conductive the discharging transistor T5, thereby short-circuiting sample-and-hold capacitor C19, as shown at MP5 in FIG. 2; i.e., the potential at the upper terminal of C19 rises to +15 V. Then, sample-and-hold capacitor C19 commences to charge negative, towards the negative potential at the output of comparator A3, via charging diode D25 and resistor R45. When the negative pulse at the output of comparator A3 ends, such negative charging of capacitor C19 likewise ends. Diode D25 prevents the now positive comparator output potential from charging capacitor C19 in the positive direction. Accordingly, the upper terminal of sample-and-hold capacitor C19 now holds a potential having a magnitude which corresponds to the duration of the just ended comparator output pulse. If the tachometer pulse train is lagging the reference signal, so that the motor requires a brief compensatory speed increase, then the potential at the upper terminal of capacitor C19 will be relatively low; relatively high for the case of a leading phase.

The voltage at the upper terminal of sample-and-hold capacitor C19 is applied, via resistor R5, to the inverting input of operational amplifier B3. The non-inverting input receives merely a potential determining the amplifier's operating point.

If, as already stated, the tachometer pulse train is lagging the reference signal, so that the motor requires a brief compensatory speed increase, then the potential at the upper terminal of capacitor C19—and thus on the "−" input of B3—will be relatively low. As a result, the output potential of amplifier B3 will be relatively high, thus increasing the motor rpm during this cycle of the tachometer pulse train and the timing signal.

On the other hand, if the tachometer pulse train is leading the reference signal, thus requiring brief motor rpm reduction to compensate, the potential at the upper terminal of capacitor C19 will be relatively high, and thus the output potential of amplifier B3 relatively low, and the brief compensatory reduction in motor rpm will be effected.

If after one such cycle of compensation the phase error (lag or lead) has not been completely eliminated, a further such cycle of compensation is performed; etc.

Further consideration will now be given to the reference signal MP3.

As already stated, a (non-illustrated) quartz-oscillator stage supplies to circuit line 303 a reference-frequency signal constituted of rectangular pulses. A differentiating capacitor C41 converts the leading and trailing flanks into positive and negative pulses of brief duration, and the negative pulses each render charging transistor T23 briefly conductive, causing the potential at the upper terminal of storage capacitor C40 to charge positive. When transistor T23 then becomes non-conductive, storage capacitor C40 commences to discharge to ground through discharge resistor R73 and potentiometer R74. The charging rate of capacitor C40 is relatively high, and its discharging rate relatively low. As shown at MP3 in FIG. 2, the rising flank of the reference signal is steep, and the descending flank falls relatively gradually. Moreover, the charging and discharging time constants, and also the potentials which capacitor C40 is permitted to reach at the end of the charging and at the end of the discharging, are so selected that the slowly decreasing falling flank of the reference signal decreases substantially linearly.

The fraction of a reference-signal period consumed by the rising flank of the reference signal is relatively short, and that consumed by the falling flank relatively long. Ideally, the rising-flank interval would be 0% and the falling-flank interval 100%, so that the detectable phase error could vary in a range equal to a full period of the reference-signal cycle. Persons skilled in the art will appreciate, however, that a 0%:100% ratio cannot be achieved. In practice the best ratio that can be feasibly achieved is about 5%:95%; a ratio of 20%:80% can be achieved unproblematically. In any event, the falling-flank interval, within which the phase error can be measured, is preferably considerably in excess of half the period of the reference signal.

In the foregoing description of operation, it was first assumed that the rpm error is zero and the phase error likewise zero; and then that the rpm error is zero but the phase error non-zero. It will be appreciated, however, that when for example the motor is starting up from zero rpm, the rpm error will be very considerable, and in such state considerations of phase error will be meaningless.

Accordingly, it is to be pointed out that the reference signal MP3 can serve not merely as a phase-reference signal but also as an rpm-reference signal. In particular, the average value of the reference signal constitutes the rpm-reference information, whereas the superimposed sawtooth component constitutes the phase-reference information (useful when the rpm error is zero). In the illustrated circuit, motor energization is controlled by the duration of the negative output pulse of comparator A3; such duration is, as shown at MP2,3 in FIG. 2, determined by the length of time, during one cycle of timing signal MP2, during which timing signal MP2 exceeds the instantaneous value of reference signal MP3. If such duration were dependent not on the instantaneous value of the reference signal, but instead upon its average value, then such duration would be accurately indicative of the amount of the rpm error. Because the duration of output pulse MP4 is in fact determined by the instantaneous value, not the average value, of reference signal MP3, such duration serves as a somewhat inaccurate measure of the amount of the rpm error. The degree of inaccuracy is determined by the difference between the instantaneous and average values of the reference signal MP3. In case of rpm error, during for example motor start-up, the point in time P at which the timing signal MP2 reaches the value of the reference signal MP3 is indeterminate. Thus, the difference between the instantaneous value and the average value of reference signal MP3 at such point in time is likewise indeterminate.

To reduce the amount of the inaccuracy, use is made of the start-up transistor T24. When T24 is conductive, it connects the upper terminal of storage capacitor C40 to the +15 V line via resistor R76, i.e., in parallel to the charging circuit formed by resistor R70 and the emitter-collector path of charging transistor T23. As already stated, storage capacitor C40 is charged via T23 for only a brief fraction of the period of the reference signal MP3; thus, during the much larger remainder of the period, the potential at the upper terminal of C40 tends merely to be established by voltage division between resistor R76 on the one hand, and on the other hand the series combination of resistors R73 and R74. In this way, the amplitude of the sawtooth component of reference signal MP3 can be greatly attenuated, leaving mainly only the d.c. or average component thereof. This serves, for example during start-up, to cause the duration of the output pulse of comparator A3 to be a much more accurate indication of the amount of the rpm error. In effect, the reference signal is thus converted into a more nearly flat signal serving as an rpm-reference level.

It is to be noted, however, that such attenuation of the amplitude of the sawtooth component of reference signal MP3 during motor start-up is not strictly necessary. If the amplitude of the sawtooth component is a very small fraction of the average value of the reference signal, then the degree of inaccuracy in the indication of the rpm error may be acceptably low; however, this would be achieved at the cost of reduced sensitivity to phase error, i.e., after elimination of the rpm error. Thus, the procedure of attenuating the sawtooth component in the case of rpm error permits one to use, after elimination of the rpm error, a sawtooth component of relatively large amplitude, which makes for great sensitivity to phase error.

In the illustrated circuit, the switching of start-up transistor T24 is controlled at its base from the output of operational amplifier B3; and thus in dependence upon the duration of the output pulse from comparator A3, and thereby in dependence upon the amount of the rpm error.

Concerning the depiction of signals in FIGS. 2-4, it should be noted that these are not drawn to scale, but only in an explanatory manner. The durations of the shown short pulses are in reality much briefer than can be readily depicted; likewise the variations in such durations are greatly exaggerated to permit depiction, as is also the variation in the base level of signal MP5. Also, the charging and discharging curves depicted may be less linear than shown, except for the falling flanks of MP3 which should be as linear as possible.

It will be understood that each of the elements described above, or two or more together, may also find a useful application in other types of motor-regulation circuits differing from the type described above.

While the invention has been illustrated and described as embodied in a very particular circuit for regulation of motor rpm and phase, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for regulating the rpm and phase of a motor, comprising
    timing circuit means producing a periodic timing signal whose value changes during the period thereof and whose frequency depends on actual motor rpm;
    means generating a reference signal including a periodic component having a frequency equal to the frequency which the periodic timing signal achieves at the desired rpm;
    motor-control means, including a comparator receiving said timing signal and said reference signal, and operative for controlling motor energization in dependence upon the point in time at which said timing signal reaches the value of said reference signal;

whereby, when the actual motor rpm equals the desired rpm, said point in time will vary within the period of said reference signal in a manner dependent on the phase difference between said timing signal and said reference signal, the variation of the value of said periodic component during the period thereof being so selected that said point in time can vary in a phase-difference-indicating manner within a range amounting to considerably more than half the period of said periodic component.

2. An arrangement as defined in claim 1, said range amounting to at least 80% of the period of said periodic component.

3. An arrangement as defined in claim 2, wherein said range amounts to at least 95% of the period of said periodic component.

4. An arrangement as defined in any of claims 1-3, said periodic component of said reference signal being of sawtooth-waveform shape having during each period thereof a rising flank and a falling flank, one flank being of longer duration than the other flank, said range corresponding to the longer flank.

5. An arrangement as defined in claim 4, the longer flank being at least approximately linear.

6. An arrangement as defined in claim 1, the length of time during which the timing signal is beyond the average value of the reference signal being, in the case of rpm deviation, an indication of the amount of the rpm error, said comparator producing an output pulse having a duration corresponding to the length of time during which the timing signal is beyond the instantaneous value of the reference signal, said duration accordingly being an inaccurate indication of the amount of rpm error, the degree of inaccuracy corresponding to the difference between said average and instantaneous values, said motor-control means being operative for controlling motor energization in dependence upon said duration.

7. An arrangement as defined in claim 6; furthermore comprising start-up means operative when the actual motor rpm is below the desired rpm for attenuating the amplitude of the periodic component of the reference signal, thereby to reduce the difference between said average and instantaneous values and correspondingly increase the accuracy with which said duration indicates the amount of rpm error.

8. An arrangement as defined in claim 7, said start-up means being operative or inoperative in dependence upon said duration.

9. An arrangement as defined in claim 6, said motor-control means furthermore including a duration-measuring circuit operative for measuring said duration and converting the same into a lengthier motor-control signal.

10. An arrangement as defined in claim 1, the reference-signal-generating means comprising storage capacitor means, and means for charging and discharging the storage capacitor means to produce at the storage capacitor means a periodic reference signal which comprises a first portion of relatively short duration changing in value in a first direction and a second portion of relatively long duration changing in value in an opposite second direction, said longer duration being considerably more than half the period of said periodic component of the reference signal.

11. An arrangement as defined in claim 10, the means for charging and discharging the storage capacitor means having an input terminal for receipt of a stabilized-frequency periodic signal from a stabilized-frequency device, the means for charging and discharging the storage capacitor means furthermore comprising first means responding to a predetermined time point in the period of the stabilized-frequency periodic signal by causing the value of the reference signal to change in said first direction thereof and thereby initiate said first portion of said reference signal, and second means thereafter operative for causing the value of the reference signal to change in said second direction thereof and thereby initiate said second portion of said reference signal, wherein said periodic reference signal has an average value, and wherein the changes in the value of said reference signal during said first and second portions thereof serve to form said periodic component of the reference signal.

12. An arrangement as defined in claim 11, the storage capacitor means and the means for charging and discharging the storage capacitor means together defining a charging time constant and a discharging time constant for the storage capacitor means, the reference-signal-generating means furthermore including amplitude-modifying means operative in dependence upon motor speed for reducing the amplitude of said periodic component of said reference signal without similarly changing said average value of said reference signal by modifying at least one of said time constants.

13. An arrangement as defined in claim 12, said amplitude-modifying means comprising means for modifying at least one of said time constants in dependence upon the difference between the actual rpm of the motor and the desired rpm for the motor.

14. An arrangement as defined in claim 13, said storage capacitor means comprising a storage capacitor having a terminal at which is produced said reference signal, said means for charging and discharging the storage capacitor means comprising a semiconductor charging switch forming said first means and operative when conductive for rapidly charging said storage capacitor by feeding current to said terminal of the latter, and a resistive discharge current path connected to said terminal and forming said second means and effecting relatively slow discharge of the storage capacitor, said amplitude-modifying means comprising a resistive charging current path and a semiconductor switch operative when activated for connecting the resistive charging current path to said terminal of the storage capacitor to effect supply of replenishing charging current to the storage capacitor during the time that the latter is being discharged through said discharge current path.

15. An arrangement as defined in claim 1, the motor-control means comprising duration-dependent means operative for controlling motor energization in dependence upon the duration of the time interval during which the timing signal is beyond the value of said reference signal.

16. An arrangement as defined in claim 15, the duration-dependent means being operative for controlling motor energization in dependence upon the duration of the time interval during which the timing signal is greater than the value of said reference signal.

17. An arrangement as defined in claim 1 or 15, the timing circuit means comprising timing capacitor means and means for charging and discharging the timing capacitor means to produce at the timing capacitor means a periodic timing signal which comprises a first portion of relatively short duration changing in value in a first direction and a second portion of relatively long duration changing in value in an opposite second direction.

18. An arrangement as defined in claim 17, the timing circuit means furthermore comprising means operative for generating a periodic rotation-indicating signal whose frequency is proportional to the rpm of the motor, said charging and discharging means comprising first means responding to a predetermined time point in the period of the periodic rotation-indicating signal by causing the value of the timing signal to change in said first direction and thereby initiate said first portion of said timing signal, and second means thereafter operative for causing the value of the timing signal to change in said second direction and thereby initiate said second portion of said timing signal.

19. An arrangement as defined in claim 18, said timing capacitor means being a timing capacitor, said rotation-indicating signal being a rectangular pulse train whose pulses have rising and falling flanks, said first means comprising a differentiating capacitor receiving said pulse train and in response to its rising flanks generating positive pulses, and a discharge switch operative when rendered conductive by said positive pulses for discharging said timing capacitor, and wherein said second means comprises a charging current path operative for charging said timing capacitor from a source of voltage.

20. An arrangement as defined in claim 1, said motor-control means including persisting-signal-generating means operative for generating a persisting signal whose persisting value is dependent upon the time of occurrence of said point in time, and means for controlling motor energization in dependence upon the value of said persisting signal.

21. An arrangement as defined in claim 15, said motor-control means including persisting-signal-generating means operative for generating a persisting signal whose persisting value is dependent upon said duration, and means for controlling motor energization in dependence upon the value of said persisting signal.

22. An arrangement as defined in claim 20 or 21, said comparator being operative for producing an output signal which has a first value when said timing signal exceeds said reference signal and a different second value when said reference signal exceeds said timing signal, said persisting-signal-generating means comprising sample-and-hold capacitor means, and charging and discharging means for said sample-and-hold capacitor means operative for causing the potential at said sample-and-hold capacitor means to change relatively slowly in a first direction during the time that said comparator output signal is at a predetermined one of said values thereof and relatively abruptly in an opposite second direction in response to a predetermined change in the value of said comparator output signal.

23. An arrangement for regulating the rpm and phase of a motor, comprising
timing circuit means producing a periodic timing signal whose value changes during the period thereof and whose frequency depends on actual motor rpm;
means generating a reference signal including a periodic component, said periodic component having a value which changes in a first direction during at least a first portion of the period of said periodic component and which changes in an opposite second direction during at least a second portion of the period of said periodic component, at least one of said portions of the period of said periodic component being a substantial portion thereof,
motor-control means, including a comparator receiving said timing signal and said reference signal, and operative for controlling motor energization in dependence upon the point in time at which said timing signal reaches the value of said reference signal,
whereby, when the actual motor rpm equals the desired rpm, said point in time will vary within said substantial portion of said period of said periodic component of said reference signal in a phase-difference-indicating manner dependent upon the phase difference between said timing signal and said periodic component of said reference signal.

24. An arrangement as defined in claim 23, wherein the value of said periodic component of said reference signal changes through a series of values during said substantial portion of said period thereof.

25. An arrangement as defined in claim 24, wherein the value of said periodic component of said reference signal changes in a continuous manner during said substantial portion of said period thereof.

26. An arrangement as defined in claim 25, wherein the value of said periodic component of said reference signal increases linearly during said substantial portion of the period thereof.

27. An arrangement as defined in claim 23, the reference-signal-generating means comprising storage capacitor means, and means for charging and discharging the storage capacitor means to produce said periodic component at the storage capacitor means.

28. An arrangement as defined in claim 27, the means for charging and discharging the storage capacitor means having an input terminal for receipt of a stabilized-frequency periodic signal from a stabilized-frequency device, the means for charging and discharging the storage capacitor means furthermore comprising first means responding to a predetermined time point in the period of the stabilized-frequency periodic signal by causing the value of the reference signal to change in said first direction thereof and thereby initiate said first portion of said periodic component, and second means thereafter operative for causing the value of the reference signal to change in said second direction thereof and thereby initiate said second portion of said periodic component, wherein said periodic reference signal has an average value, and wherein the changes in the value of said reference signal during said first and second portions thereof serve to form said periodic component of the reference signal.

29. An arrangement as defined in claim 28, the storage capacitor means and the means for charging and discharging the storage capacitor means together defining a charging time constant and a discharging time constant for the storage capacitor means, the reference-signal-generating means furthermore including amplitude-modifying means operative in dependence upon motor speed for reducing the amplitude of said periodic component of said reference signal, without similarly changing said average value of said reference signal, by modifying at least one of said time constants.

30. An arrangement as defined in claim 29, said amplitude-modifying means comprising means for modifying at least one of said time constants in dependence upon the difference between the actual rpm of the motor and the desired rpm for the motor.

31. An arrangement as defined in claim 30, said storage capacitor means comprising a storage capacitor having a terminal at which is produced said reference signal, said means for charging and discharging the storage capacitor means comprising a semiconductor charging switch forming said first means and operative when conductive for charging said storage capacitor by feeding current to said terminal of the latter, and a resistive discharge current path connected to said terminal and forming said second means and effecting discharge of the storage capacitor, said amplitude-modifying means comprising a resistive charging current path and a semiconductor switch operative when activated for connecting the resistive charging current path to said terminal of the storage capacitor to effect supply of replenishing charging current to the storage capacitor during the time that the latter is being discharged through said discharge current path.

32. An arrangement as defined in claim 23, the motor-control means comprising duration-dependent means operative for controlling motor energization in dependence upon the duration of the time interval during which the timing signal is beyond the value of said reference signal.

33. An arrangement as defined in claim 32, the duration-dependent means being operative for controlling motor energization in dependence upon the duration of the time interval during which the timing signal is greater than the value of said reference signal.

34. An arrangement as defined in claim 23 or 32, the timing circuit means comprising timing capacitor means and means for charging and discharging the timing capacitor means to produce at the timing capacitor means a periodic timing signal which comprises a first portion of relatively short duration changing in value in a first direction and a second portion of relatively long duration changing in value in an opposite second direction.

35. An arrangement as defined in claim 34, the timing circuit means furthermore comprising means operative for generating a periodic rotation-indicating signal whose frequency is proportional to the rpm of the motor, said charging and discharging means comprising first means responding to a predetermined time point in the period of the periodic rotation-indicating signal by causing the value of the timing signal to change in said first direction thoreof and thereby initiate said first portion of said timing signal, and second means thereafter operative for causing the value of the timing signal to change in said second direction thereof and thereby initiate said second portion of said timing signal.

36. An arrangement as defined in claim 35, said timing capacitor means being a timing capacitor, said rotation-indicating signal being a rectangular pulse train whose pulses have rising and falling flanks, said first means comprising a differentiating capacitor receiving said pulse train and in response to its rising flanks generating positive pulses, and a discharge switch operative when rendered conductive by said positive pulses for discharging said timing capacitor, and wherein said second means comprises a charging current path operative for charging said timing capacitor from a source of voltage.

37. An arrangement as defined in claim 23, said motor-control means including persisting-signal-generating means operative for generating a persisting signal whose persisting value is dependent upon the time of occurrence of said point in time, and means for controlling motor energization in dependence upon the value of said persisting signal.

38. An arrangement as defined in claim 32, said motor-control means including persisting-signal-generating means operative for generating a persisting signal whose persisting value is dependent upon said duration, and means for controlling motor energization in dependence upon the value of said persisting signal.

39. An arrangement as defined in claim 37 or 38, said comparator being operative for producing an output signal which has a first value when said timing signal exceeds said reference signal and a different second value when said reference signal exceeds said timing signal, said persisting-signal-generating means comprising sample-and-hold capacitor means, and charging and discharging means for said sample-and-hold capacitor means operative for causing the potential at said sample-and-hold capacitor means to change relatively slowly in a first direction during the time that said comparator output signal is at a predetermined one of said values thereof and relatively abruptly in an opposite second direction in response to a predetermined change in the value of said comparator output signal.

* * * * *